United States Patent [19]

Pietrzak et al.

[11] Patent Number: 4,922,174
[45] Date of Patent: May 1, 1990

[54] SEAM TRACKING BETWEEN MATING PARTS

[75] Inventors: Kenneth A. Pietrzak, Uncasville; Scott M. Packer, Manchester; Kenneth C. Dunne, Somers, all of Conn.

[73] Assignee: United Technologies Corporation, Hartford, Conn.

[21] Appl. No.: 325,427

[22] Filed: Mar. 20, 1989

[51] Int. Cl.⁵ .......................... G05B 19/33; B23K 9/12
[52] U.S. Cl. .................................. 318/577; 219/124.34
[58] Field of Search ....................... 219/124.34, 130.01, 219/124.22; 318/577

[56] References Cited

U.S. PATENT DOCUMENTS

| | | | |
|---|---|---|---|
| 4,542,279 | 9/1985 | Case, Jr. et al. | 219/124.34 |
| 4,568,816 | 2/1986 | Casler, Jr. | 219/124.34 |
| 4,593,173 | 6/1986 | Bromley et al. | 219/124.34 |
| 4,595,820 | 6/1986 | Richardson | 219/130.01 |
| 4,737,614 | 4/1988 | Richardson | 219/124.34 |

Primary Examiner—Clifford C. Shaw
Attorney, Agent, or Firm—Edward L. Kochey, Jr.

[57] ABSTRACT

A rough taught tentative seam track is refined using the electronic image of a matrix camera. The sensed image is rotated perpendicular to the tentative track. A horizontal row of pixels is processed with a filter to enhance the seam and reject other signals. Weighted voting of various features aids in selection of the proper seam image and its location. Offset is applied to the tentative track to provide a true track.

13 Claims, 4 Drawing Sheets

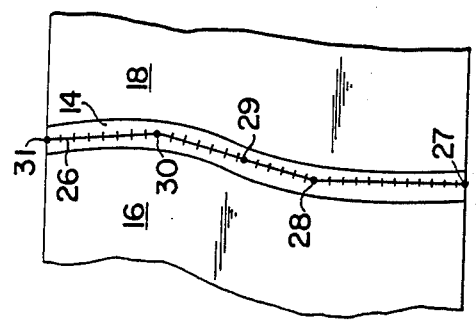
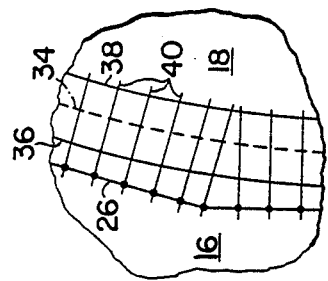
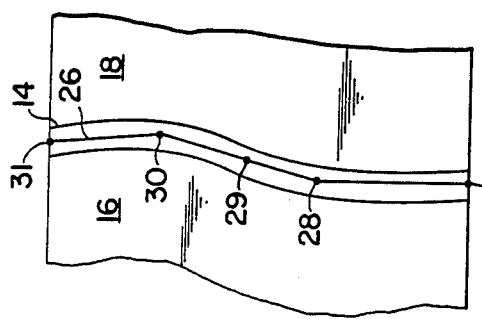
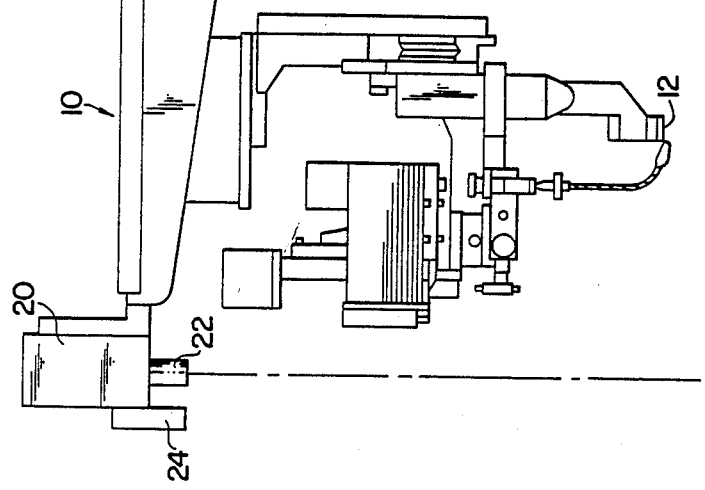

CAMERA IMAGE

TORCH ROTATION: θ

ROTATED IMAGE AND
OFFSET COMPUTATION dx = r cos θ
dy = r sin θ

PREV. SEAM LOCATION: 38
PREV. SEAM WIDTH: 14
WIDTH RANGE: 6-20
NEG. PEAKS: 29, 55, 84
POS. PEAKS: 39, 45, 67

SEAM TRACKING BETWEEN MATING PARTS

TECHNICAL FIELD

The invention relates to tracking of a seam in material to be joined; and in particular, to refining a coarsely taught trajectory.

BACKGROUND OF THE INVENTION

With the automation of arc welding and several other industrial processes, much effort has gone into the development of automatic seam tracking systems. Generally, a robot is programmed using a teach pendant to direct the robot from point to point of the seam. This is a rather precise operation since it is this taught path which a robot will following during processing. As the parts become more complex, this job becomes very tedious and can take several hours. Also, due to part-to-part variations and limited precision in the robot and part fixturing, the robot may not repeatedly follow the seam, resulting in poor quality welds.

A number of methods employing a variety of sensing systems have been applied to seam tracking. Mechanical and electromechanical contacting sensors employing mechanical probes have been used on long, straight, voluminous seams with success. These systems are simple and inexpensive but are intrusive and limited to very simple parts and joints. Eddy current devices and other types of magnetic sensing systems are now being marketed for seam tracking applications having the advantages of low cost high resolution and simplicity. However, these devices have suspect reliability, especially for some joint types, and require perfect fixturing. They are also intrusive and sensitive to electromagnetic interference and weldment temperatures.

Computer vision based seam tracking methods are now becoming more prevalent. These techniques employ a matrix camera to view the seam. A coaxial viewing torch for welding is shown in U.S. Pat. No. 4,595,820 issued to Richard W. Richardson. It uses arc illumination from the torch to highlight the seam. The approach is nonintrusive and has a fairly high resolution but will not work for all joint types and is limited to certain types of welding. The torch is also expensive. Other approaches such as shown in U.S. Pat. No. 4,542,270 issued to Alan W. Case, Jr. et al use structured lighting (usually a plane of laser light) to cast the pattern on the seam. The advantage of this approach is good reliability and the ability to measure three dimensional joint geometry. However, these systems can be very expensive, sometimes lacking the resolution required and can be fairly intrusive.

SUMMARY OF THE INVENTION

The seam to be followed is rough taught to the robot. This rough tentative trajectory is refined with the parts to be joined in place. A matrix camera is focused on the seam establishing electronic image which includes the seam. The image is rotated so that the horizontal direction of the electronic image sweep is perpendicular to the tentative direction of the track. This rotated image is then evaluated to locate the edges of the seam based on the local gray level gradients. The offset of this actual location from the tentative track is remembered by the processor and applied during the later welding operation.

False readings of the seam location are deterred by processing the data in a manner to emphasize the edges of the seam. A filter is applied using negative coefficients on one side of the point under inspection and a positive amplification on the other side to produce high negative and positive peaks in the resulting data. This filter is equal to or a little less than twice the width of the seam so that it will react most strongly to an indication approximating the seam width and thereby give lower indications for scratches and other false readings.

Other criteria is also applied to differentiate between the proper seam location indication and other aberrations. These include comparing the distance between peaks to the expected width of the seam either from knowledge of the design or from storage of a previous frame. Proper left to right orientation of maximum and minimum values avoids the need to investigate erroneous readings. The system may furthermore react more favorably to maximum peaks in either the positive or negative direction. Each of the various criteria may be weighted for voting with these criteria then applied to the process signal to select that which gives the actual seam location.

BRIEF DESCRIPTION OF THE DRAWINGS

FIG. 1 is a view of a robot, weld head and camera showing the environment in which the invention works.

FIG. 2 illustrates a rough taught trajectory.

FIG. 3 illustrates the points used in refining the trajectory.

FIG. 4 is a detail of portion 4 of FIG. 3.

DESCRIPTION OF THE PREFERRED EMBODIMENT

Figure 5:
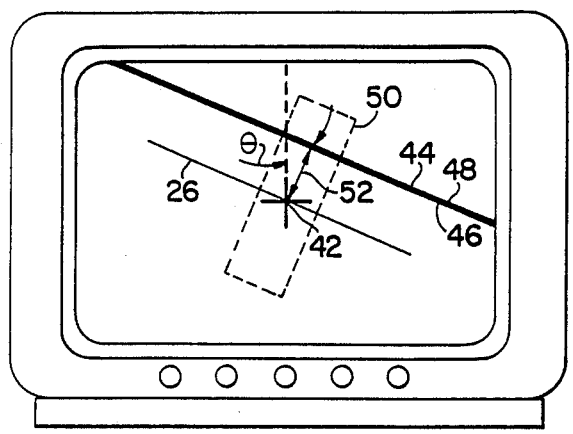
FIG. 5 is a video image of an electronic image unrotated.

A robot 10 carries a weld head 12 used ultimately to weld a seam 14 between work pieces 16 and 18. Also located on the robot is video camera 20 with lens 22 and illumination source 24. The camera and weld head are not used simultaneously and each is arranged to be out of the way of the other during operation. Of course, the camera is in location during the refinement of the track, the offset between the weld torch and the camera is known and compensated for within the robot.

FIG. 2 illustrates a seam 14 to be tracked between work pieces 16 and 18. A tentative track 26 may be established by earlier calculation but is preferably established by the use of a conventional teach pendant. The teach pendant is placed at locations 27 through 31 sequentially so that the robot is programmed to establish a straight line path between these points.

FIG. 3 illustrates a plurality of smaller discrete steps which are taken in refining the coarsely taught tentative trajectory in accordance with the invention.

FIG. 4 illustrates this in more detail. The centerline of the seam 34 lies between the left edge 36 of the seam and the right edge 38 of the seam. View lines 40 crossing the seam are perpendicular to the tentative track 26 and accordingly may not be precisely perpendicular to the seam although they are close to that position.

The camera 20 is focused on the work piece at an initial location on the tentative track which includes the seam. An electronic image is formed, and while it need not necessarily be transferred to a video image, the video image is shown for purposes of description. The image seen may be as shown in FIG. 5. Point 42 is the center point which is located on the tentative track location. Line 44 represents the image of the seam with a left edge 46 and a right edge 48. A wide rectangle 50 is selected with its center being the base location 42, and with the rectangle in its long dimension being perpendicular to tentative track 26.

Figure 6:
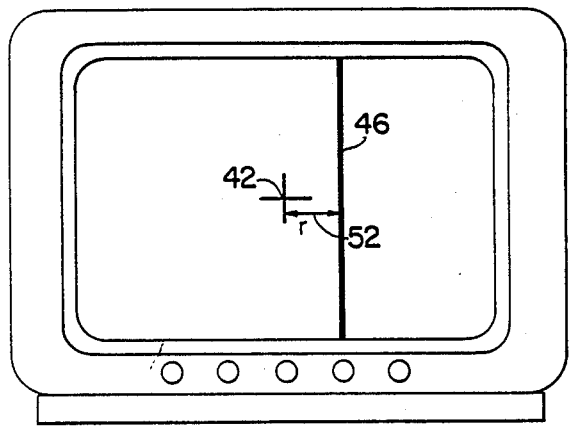
FIG. 6 is a video image of the rotated electronic image.

Since the angle of this tentative track is known, the image may be electronically rotated to the rotated form illustrated in FIG. 6. The offset 52 of the actual seam location with respect to the nominal point 42 on the tentative tracking line is a dimension to be determined. With the image electronically rotated, this can be relatively simply accomplished by examining pixels in the horizontal electronic scan of the rotated image. It is an object of this invention to locate the seam with respect to the initial location 42 for correction of the tentative track. It is also important that differentiation be made between the actual seam and other scratches and defects on the material.

Figure 7:
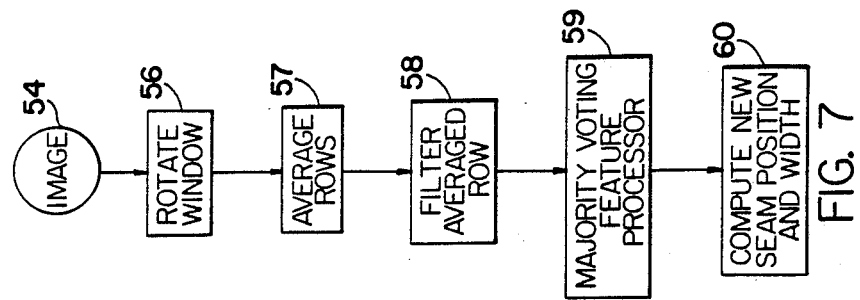
FIG. 7 is a logic diagram illustrating the processing steps.

FIG. 7 illustrates the steps in the overall logic in achieving this results. 54 indicates establishment of an electronic image with box 56 illustrating the rotation of the window to the horizontal position in the electronic image.

As indicated by box 57, with respect to the pixels, each vertical column including a selected plurality of rows is averaged with the result treated as a single horizontal scan. This averaging process improves the signal to noise ratio by reducing or eliminating the effects of noise spots and scratches or lighting artifacts which do not run approximately parallel to the seam. There is a trade-off between the number of rows in the window and processing time. A trade-off between the number of rows in the window and a seam location accuracy must also be considered if the seam has significant curvature to it or if the seam deviates significantly from vertical. As indicated in box 58 the resulting row of data is processed with a filter to enhance the edges of the seam.

A majority voting feature processor 59 applies weight values to various features to facilitate location of the seam and to reject spurious signals. As indicated in box 60, the new seam position and width may then be calculated with this information being retained in memory and applied as an offset to the tentative track. For a later welding operation, the tentative track with a known offset provides precise positioning for welding or any other operation carried out.

Where welding in an assembly line method a plurality of parts, the invention may be used one of two ways. Where fixturing is precise and tolerance of the various pieces is closely held, the roughly taught path may be corrected only once with the corrected path being used for welding of all the pieces. Alternatively, the same coarsely taught tentative path, or a previously refined path, may be used with the refinement operation carried out for each new welding operation, this being practical because of the speed and simplicity of the operation.

Figure 8:
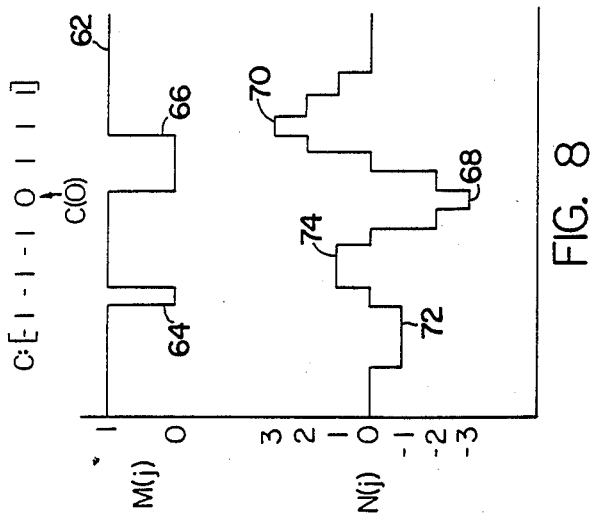
FIG. 8 illustrates a typical matched filter.

Referring now to step 58 which filters the averaged row of pixels, reference is made to FIG. 8 where curve 62 represents the gray level electronically determined in a horizontal scan with a decrease in the gray level at scratch 64 and seam 66.

The averaged row of data referred to as the raw data is then processed with the filter to enhance the edges of the seam. The filtering process is performed by convolving the row of image data with a coefficient factor representing the filter. Here, convolution is defined as a weight sum of the gray level values in a one pixel by two K pixel neighborhood. Where J is the pixel under investigation, and U represents the adjacent pixels from minus K to plus K, the processing value at J equals the summation from minus K to plus K, of the filter applied coefficient at each location times the gray level at each location. This is represented as $$N(j) = \sum_{u=-k}^{k} (C(u) * M(j + u))$$

The coefficients of the filter are chosen so that the resulting signal peaks where the edges (gradients) occur. For instance, the coefficient is minus 1 for all minus K positions and plus 1 for all plus K positions.

These weights have been chosen such that the convolution can be achieved with simple additions and subtractions. The left edge of a seam is indicated by a negative peak 68 since the high intensity pixels on the left side of the edge would be subtracted from the low intensity pixels on the right side of the edge. Similarly, the right edge of the seam is indicated by a positive peak 70 in the filtered signal.

The parameter K is selected to be less than or equal to the smallest expected width of the seam in pixels. By this selection, the effects of scratches or lighting artifacts which run parallel to the seam and have the same gray level values can be reduced or eliminated where their widths are less than K. This is demonstrated by the lower value of peaks 72 and 74 resulting from scratch 64.

A fixed value of K based on the known seam width may be used if desired. However, an improvement under some conditions may be achieved by storing the last frame of data and determining the width of the seam in this earlier frame. The width of this seam from the earlier frame is then used to establish the K for the subsequent frame.

The next step is to process the filtered signal to locate the edges of the seam and the majority voting feature process of 59 facilitates this. Although the edges of the seam are indicated by negative and positive peaks, there may be other more intense peaks caused by scratches in the surface of the part, lighting artifacts, and other types of noise. To identify the correct combination of peaks, the location (J) and the corresponding process values of the edge peaks are sent to the majority voting feature processor.

Figure 9:
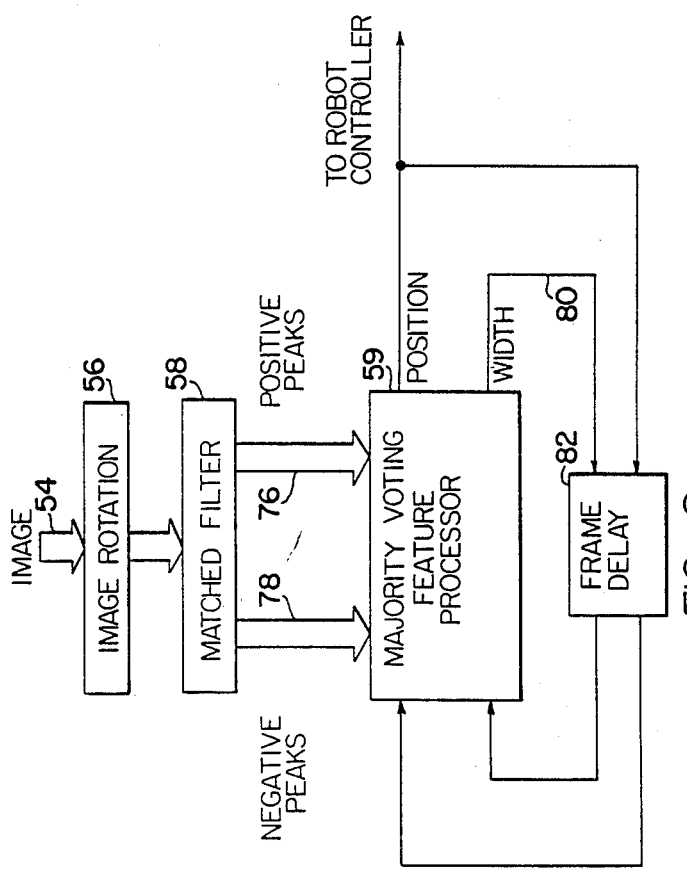
FIG. 9 is a logic diagram showing the use of the filter.

Referring to FIG. 9 the positive peaks 76 and the negative peaks 78 are sent to the voting feature processor 59. All valid negative peak and positive peak combinations are determined from logical thresholds and comparisons. For example, peaks may be eliminated from consideration immediately if their values did not exceed a specified threshold. Scanning the signal from left to right combinations which have a positive peak occurring before a negative peak are eliminated immediately. The width of a combination is computed by subtracting the location of the negative peak from the location of the positive peak. If the width does not fall within a specified range, that combination is eliminated.

The resulting candidate combinations are then awarded weighted votes based on certain features. For example, one vote may be assigned to any combination which includes the most negative peak or the most positive peak. A vote may be awarded to the combination with the highest edge strength, where edge strength is computed by subtracting the negative peak value from the positive peak value. The center gray level intensity between edges may be computed for each combination from the raw image data and a vote awarded to the lowest intensity.

The seam location is computed as the average position between the negative and positive peaks, this representing the centerline of the seam. This width determination may be sent through line 80 to frame delay 82, and the width from the previous frame used to award a weighted vote based on how close the width between two peaks is to the width of the seam as determined by the previous votes. A weighted vote may be based on the proximity of the peak indications to the location of the seam in the previous frame. These provisions help maintain seam tracking despite deep marks or scratches running parallel to the seam. One of the above features must also be chosen to break ties. The offset from the desired center location 42 is computed and sent to the robot controller for correction.

Figure 10:
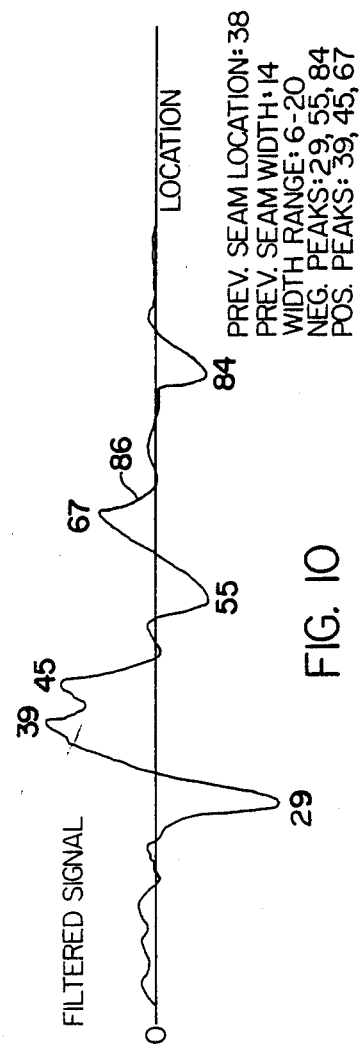
FIG. 10 is an illustration of the application of the invention with typical signals.

The features and weights used in the majority voting schemes are application dependent. For example, if the light source is uniform and the surface is fairly clean, the center gray level intensity of the combination may be given more weight. For an application where lighting cannot be controlled, the gray level intensity may be given no weight. An example of a majority voting process is shown in FIG. 10. In this case, the features given weights are the lowest and highest peaks, the nearest width to the previous seam width, and the nearest location to the previous seam location. All votes having a weighting value of 1.

The filtered signal 86 has negative peaks at pixel locations 29, 55 and 84 with positive peaks at pixel locations 39, 45 and 67. Table 1 shows the various combinations of peaks and the location representing the center between the two pixel locations.

TABLE 1
POSSIBLE NEGATIVE PEAK/POSITIVE PEAK COMBINATIONS

| Combination | Location | Width | Valid? |
|---|---|---|---|
| (29,39) | 34 | 10 | Yes |
| (29,45) | 37 | 16 | Yes |
| (29,67) | 48 | 38 | No, Width Out of Range |
| (55,39) | 47 | −16 | No, Positive Peak Before Negative Peak |
| (55,45) | 50 | −10 | No, Positive Peak Before Negative Peak |
| (55,67) | 61 | 12 | Yes |
| (84,39) | 61.5 | −45 | No, Positive Peak Before Negative Peak |
| (84,45) | 64.5 | −39 | No, Positive Peak Before Negative Peak |
| (84,67) | 75.5 | −17 | No, Positive Peak Before Negative Peak |

TABLE 2
MAJORITY VOTING

| Feature | Votes Awarded | | |
|---|---|---|---|
| | (29,39) | (29,45) | (55,67) |
| Lowest Negative Peak | 1 | 1 | — |
| Highest Postive Peak | 1 | — | — |
| Closest Width | — | 1 | 1 |
| Nearest Seam Location | — | 1 | — |
| Total | 2 | 3 | 1 |
| | | Winner | |
| | New Seam Location 37 | | |

Also known is the previous seam location which was at pixel 38 and the previous seam width which was 14 pixels. The expected width range of the seam varies from 6 to 20 pixels.

The first two combinations in the table are potentially valid. The 29, 67 combination shows a width of 38 pixels which is out of range. The 55, 39 combination is invalid because of the reversed left to right orientation of the peaks, this also applying to several other combinations. The 55, 67 combination is potentially valid. Table 2 shows the majority voting applied to the three potentially valid combinations. The combination 29, 45, while not having the highest positive peak, has the lowest negative peak, a width closest to the previous seam width and the nearest location to the previous seam location. It accordingly has the majority of votes awarded thereto.

The rotation of the scanned image so that a horizontal electronic scan may be used to evaluate the results, greatly simplifies the evaluating procedure and permits a rational rejection of spurious signals to maintain consistent, reliable seam locations.

We claim:

1. A method of automatically seam-tracking the seam between mating parts by a programmed robot comprising:
    establishing a programmed tentative track approximating the path of the seam;
    focusing a matrix camera on said parts at initial location on said tentative track of an area to include said seam;
    establishing an electronic image of said initial location;
    determining the tentative directional orientation of said tentative track at said initial location;
    electronically rotating only a portion of said image representing a wide rectangle perpendicular to said tentative directional orientation;
    detecting the seam location in said electronic image;
    determining the offset of the seam location detected in said image from said location;
    stepping along said tentative track in increments and determining the offset of the seam detected in said image from each subsequent location; and
    modifying said tentative track by said offsets and thereby determining a true track.

2. A method of automatically seam-tracking the seam between mating parts by a programmed robot comprising:
    establishing a programmed tentative track approximating the path of the seam;
    focusing a matrix camera on said parts at initial location on said tentative track of an area to include said seam;
    establishing an electronic image of said initial location;
    determining the tentative directional orientation of said tentative track at said initial location;

aligning said image perpendicular to said tentative directional orientation;
detecting the seam location in said electronic image by
locating the left and right edges of the seam based on gray level transition in said electronic image;
determining the offset of the seam location detected in said image from said location;
stepping along said tentative track in increments and determining the offset of the seam detected in said image from each subsequent location; and
modifying said tentative track by said offsets and thereby determining a true track.

3. A method as in claim 2, including also:
processing a horizontal row of said electronic data with a filter for enhancing the edges of said seam.

4. A method as in claim 3, including processing said horizontal row of data with a filter of a width equal to or slightly less than twice the width of said seam.

5. A method as in claim 3, including also:
using multiplication coefficients which are negative on one side of a pixel under investigation and positive on the other side of the pixel under investigation, whereby a resulting signal peaks where the edges occur.

6. A method of claim 5, including also:
establishing evaluation criteria relationships for application to the resulting processed signal for deterring false seam location detection, and applying said criteria to the processed signal.

7. A method as in claim 6, wherein:
said evaluation criteria includes the width between a negative peak and a positive peak in relation to the expected seam width.

8. A method of claim 7, wherein said evaluation criteria includes:
appropriate left to right orientation of maximum and minimum peaks.

9. A method as in claim 6, wherein the evaluation criteria includes:
the most negative and/or the most positive peak.

10. A method as in claim 6, including also:
storing the location of the seam from the previous frame; and
said evaluation criteria including comparing the proximity of peaks in the current frame to the previous seam location.

11. A method as in claim 6, including also:
applying voting weights to each criteria;
selecting from the various negative and positive peaks according to the applied voting weight to determined the seam location.

12. A method as in claim 3, including also:
averaging each column in a selected number of rows of electronic data for determining the horizontal row of electronic data being evaluated.

13. A method of automatically seam-tracking the seam between mating parts by a programmed robot comprising:
establishing a programmed tentative track approximating the path of the seam;
focusing a matrix camera on said parts at an initial location on said tentative track of an area to include said seam;
establishing an electronic image of said initial location;
determining the tentative directional orientation of said tentative track at said initial location;
aligning said image perpendicular to said tentative directional orientation;
processing a horizontal row of said electronic data with a filter for enhancing the edges of said seam;
using multiplication coefficients which are negative on one side of a pixel under investigation and positive on the other side of the pixel under investigation, whereby a resulting signal peaks where the edges occur;
locating the left and right edges of the seam based on gray level transition in said electronic image;
determining the offset of the seam location detected in said image from said location;
stepping along said tentative track in increments and determining the offset of the seam detected in said image from each subsequent location;
modifying said tentative track by said offsets and thereby determining a true track; and
determining a seam width based on the horizontal distance between a positive and a negative signal peak;
storing a frame of data; and
using the seam width from said stored data to determine the filter width at the next location.

* * * * *